(12) United States Patent
Watts

(10) Patent No.: US 9,632,504 B1
(45) Date of Patent: Apr. 25, 2017

(54) ROBOTIC NAVIGATION BASED ON BUILDING SURFACE CONTOURS

(71) Applicant: X Development LLC, Mountain View, CA (US)

(72) Inventor: Kevin William Watts, Palo Alto, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 14/701,396

(22) Filed: Apr. 30, 2015

(51) Int. Cl.
*G05D 1/02* (2006.01)

(52) U.S. Cl.
CPC ................. *G05D 1/0231* (2013.01)

(58) Field of Classification Search
CPC ......... G05D 1/0231; G05D 2201/0216; G01C 21/206
See application file for complete search history.

(56) References Cited

U.S. PATENT DOCUMENTS

| | | | |
|---|---|---|---|
| 6,434,329 B1* | 8/2002 | Dube | F16M 11/04 128/897 |
| 6,868,307 B2 | 3/2005 | Song et al. | |
| 6,951,138 B1 | 10/2005 | Jones | |
| 8,346,415 B1 | 1/2013 | Hinnant, Jr. | |
| 8,935,006 B2 | 1/2015 | Vu et al. | |
| 2009/0024353 A1* | 1/2009 | Lee | G05D 1/0891 702/153 |
| 2010/0070125 A1* | 3/2010 | Lee | G06T 7/0042 701/28 |
| 2012/0287280 A1 | 11/2012 | Essati et al. | |
| 2013/0138246 A1* | 5/2013 | Gutmann | G05D 1/0231 700/253 |
| 2015/0243080 A1* | 8/2015 | Steinbach | G06F 17/30244 345/633 |

OTHER PUBLICATIONS

Choi et al., "An Efficient Ceiling-view SLAM Using Relational Constraints Between Landmarks," International Journal of Advanced Robotic Systems, 2014, pp. 1-11, vol. 11, No. 4.
Hwang et al., "Monocular Vision-based Global Localization Using Position and Orientation of Ceiling Features," 2013 IEEE International Conference on Robotics and Automation (ICRA), Karlsruhe, Germany, May 6-10, 2013, pp. 3770-3775.

\* cited by examiner

*Primary Examiner* — Adam Mott
(74) *Attorney, Agent, or Firm* — McDonnell Boehnen Hulbert & Berghoff LLP

(57) ABSTRACT

An example method includes determining a depth map of at least one static surface of a building, where the depth map includes a plurality of surface contours. The method further includes receiving sensor data from one or more sensors on a robotic device that is located in the building. The method also includes determining a plurality of respective distances between the robotic device and a plurality of respective detected points on the at least one static surface of the building. The method additionally includes identifying at least one surface contour that includes the plurality of respective detected points. The method further includes determining a position of the robotic device in the building that aligns the at least one identified surface contour with at least one corresponding surface contour in the depth map.

20 Claims, 13 Drawing Sheets

ROBOTIC NAVIGATION BASED ON BUILDING SURFACE CONTOURS

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may use machines or vehicles for lifting and moving goods or pallets of goods, such as cranes and forklifts. Human operators may be employed to operate machines, vehicles, and other equipment. In some cases, one or more of the machines or vehicles may be robotic devices guided by computer control systems.

SUMMARY

Example systems and methods may help to localize a robotic device within a building. A depth map may first be generated of at least one surface of the building, such as a ceiling. The depth map may include surface contours that can be found at a later point in time by a robot to determine its position in the building. A robot operating in the building may use one or more sensors to detect points on the building surface. Distances between the robot and the detected points on the building surface may be determined based on these sensors. One or more surface contours in the depth map may be identified that include some of the detected points. A position of the robot in the building may then be determined that aligns the identified surface contours with corresponding surface contours in the depth map.

In one example, a method is provided that includes determining a depth map of at least one static surface of a building, where the depth map comprises a plurality of surface contours. The method further includes receiving sensor data from one or more sensors on a robotic device that is located in the building, where the received sensor data is indicative of the at least one static surface of the building. The method also includes determining, based on the received sensor data, a plurality of respective distances between the robotic device and a plurality of respective detected points on the at least one static surface of the building. The method additionally includes identifying at least one surface contour that includes the plurality of respective detected points on the at least one static surface of the building. The method further includes determining, based on the plurality of respective distances, a position of the robotic device in the building that aligns the at least one identified surface contour with at least one corresponding surface contour in the depth map of the at least one static surface of the building.

In another example, a robotic device is disclosed, including one or more sensors, and a control system. The control system is configured to determine a depth map of at least one static surface of a building in which the robotic device is located, where the depth map comprises a plurality of surface contours. The control system is further configured to receive sensor data from the one or more sensors, where the received sensor data is indicative of the at least one static surface of the building. The control system is additionally configured to determine, based on the received sensor data, a plurality of respective distances between the robotic device and a plurality of respective detected points on the at least one static surface of the building. The control system is also configured to identify at least one surface contour that includes the plurality of respective detected points on the at least one static surface of the building. The control system is further configured to determine, based on the plurality of respective distances, a position of the robotic device in the building that aligns the at least one identified surface contour with at least one corresponding surface contour in the depth map of the at least one static surface of the building.

In another example, a non-transitory computer readable medium is disclosed having stored therein instructions, that when executed by a control system of a robotic device, cause the control system to perform functions. The functions include determining a depth map of at least one static surface of a building, where the depth map comprises a plurality of surface contours. The functions also include receiving sensor data from one or more sensors on a robotic device that is located in the building, where the received sensor data is indicative of the at least one static surface of the building. The functions further include determining, based on the received sensor data, a plurality of respective distances between the robotic device and a plurality of respective detected points on the at least one static surface of the building. The functions also include identifying at least one surface contour that includes the plurality of respective detected points on the at least one static surface of the building. The functions further include determining, based on the plurality of respective distances, a position of the robotic device in the building that aligns the at least one identified surface contour with at least one corresponding surface contour in the depth map of the at least one static surface of the building.

In yet another example, a system may include means for determining a depth map of at least one static surface of a building, where the depth map comprises a plurality of surface contours. The system further includes means for receiving sensor data from one or more sensors on a robotic device that is located in the building, where the received sensor data is indicative of the at least one static surface of the building. The system also includes means for determining, based on the received sensor data, a plurality of respective distances between the robotic device and a plurality of respective detected points on the at least one static surface of the building. The system additionally includes means for identifying at least one surface contour that includes the plurality of respective detected points on the at least one static surface of the building. The system further includes means for determining, based on the plurality of respective distances, a position of the robotic device in the building that aligns the at least one identified surface contour with at least one corresponding surface contour in the depth map of the at least one static surface of the building.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1A:
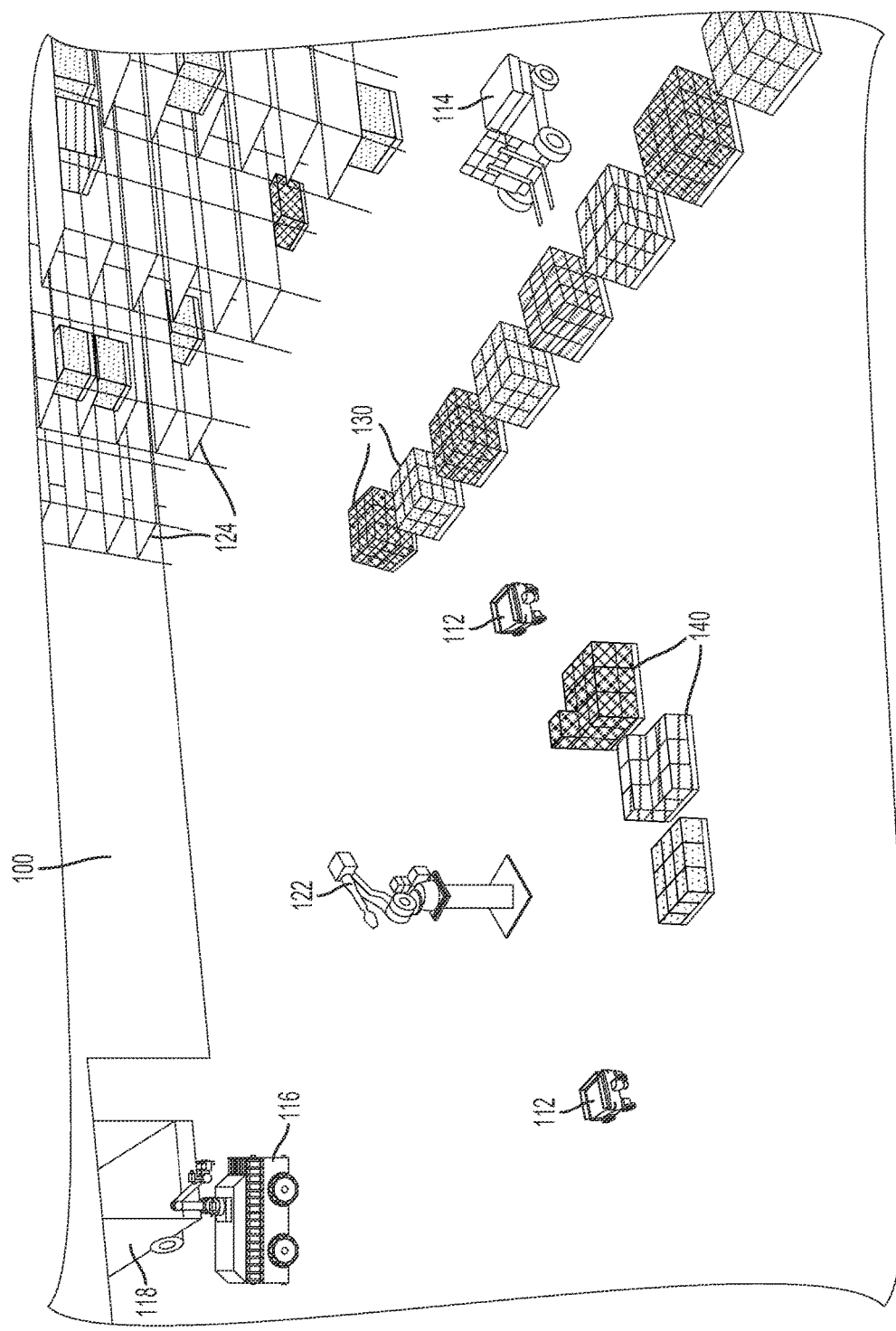
FIG. 1A shows a robotic fleet, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Within examples, a robotic device may use contours of a surface of a building, such as a ceiling, to help with localization. In particular, the ceiling of a building in which the robotic device is operating may have varying depth texture, which may include different shapes, structures, and/or patterns. For instance, a robotic device may perform warehouse operations requiring navigation within a warehouse that contains a ceiling with rafters, lighting fixtures, and/or ductwork with different depths at different points. A map of these surface contours on a building ceiling may be used to help a robotic device determine its precise location within the building. Further, the ceiling may provide stable navigating features which are unlikely to change often and are also less likely to be occluded from a robot's view than features at the ground level. Other types of buildings may also have ceilings or other static surfaces with contours that can be used for robotic navigation as well, such as factories, residential buildings, commercial buildings, or other types of structures.

In an example system, a map of building surface contours may first be generated for later use by one or more mobile robots for localization within the building. The initial contour map may be generated using one or more depth sensors. For instance, a mapping robot may be assigned to navigate through the building with a stereo camera that collects depth images of the ceiling at different points. In some examples, the same robot may generate the map of surface contours and then later use the map for localization. In other examples, one robot may generate a map of surface contours which is then used for localization by one or more other robots that operate within the building.

In additional examples, a more expensive and precise sensor may be used to generate the map of surface contours than the sensors used later by one or more robots for localization within the building. For instance, one or more precise stereo cameras may initially be used by a mapping robot to build up a dense map of ceiling contours. Another robot (e.g., one or multiple lower cost, worker robots) which is moving in the building may then navigate by using one or more less expensive sensors directed toward the ceiling to locate particular ceiling contours which were stored in the map. For example, these sensors could be relatively cheap sensor devices that provide enough distance measurements from the robot to different points on the ceiling to identify one or more of the surface contours. More specifically, a robot may be equipped with one or more laser rangefinders (e.g., single beam laser distance sensors) mounted close together on top of the robot that each point in a different upward direction toward the ceiling. One possible advantage of using laser sensors to locate contours is that they are illumination resistant.

A robot may first identify one or more ceiling contours from collected sensor data, and then determine its position in the building by aligning the identified surface contours with their corresponding surface contours in the map. To determine this position, the robot uses measured distances from the robot to detected points on the ceiling that fall within the identified surface contours. When a sensor on the robot detects points within a particular ceiling contour, the lateral distance from the robot to the points may be determined based on the position and orientation of the sensor on the robot. In some examples, the orientation of the robot itself may change relative to the ceiling (e.g., if the robot is pitching and rolling as it is driving). This may be accounted for using an inertial measurement unit (IMU) on the robot. Distance measurements between the robot and the detected ceiling contours may then be used to determine where the robot is in the building by matching the detected contours with contours in the map.

In some examples, a robot may have an initial notion of its current position within a building using one or more other localization techniques. For instance, the robot can measure locally how far it has driven using one or more distance sensors, such as wheel speed sensors. In such examples, ceiling contour navigation may then be used to further refine the location of the robot. For instance, the robot may be able to use a rough estimate of its current position to determine a relatively small search area on the map of ceiling contours to look for matching contours. The search area may then be searched to identify detected contours within the map. By first determining a rough estimate of the robot's location, laser sensors on the robot with a relatively small field of view may be used to collect the sensor data for identifying ceiling contours.

One possible advantage of using ceiling contours for robotic navigation is that in many applications, the ceiling is unlikely to be occluded from view by the robot. For instance, an autonomous robot operating in a warehouse may move down an aisle between pallet racks and may still be able to view the ceiling even though other directions are occluded. In some examples, a robot may be equipped with one or more upward facing sensors that can change orientation when their view of the ceiling is obstructed as well. In further examples, one or more of the upward facing sensors may also periodically or continuously change orientation as the robot operates to collect more ceiling contour data for precise navigation.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Example embodiments may involve a robotic fleet deployed within a warehouse environment. More specifically, a combination of fixed and mobile components may be deployed within the environment to facilitate automated processing of boxes, packages, or other types of objects. Example systems may involve automated loading and/or unloading of boxes and/or other objects, such as into storage containers or to and from delivery vehicles. In some example embodiments, boxes or objects may be automatically organized and placed onto pallets. Within examples, automating the process of loading/unloading trucks and/or the process of creating pallets from objects for easier storage within a warehouse and/or for transport to and from the warehouse may provide a number of industrial and business advantages.

According to various embodiments, automating the process of loading and/or unloading delivery trucks at the warehouse and/or the process of creating pallets may include the deployment of one or more different types of robotic devices to move objects or perform other functions. In some embodiments, some of the robotic devices can be made mobile by coupling with a wheeled base, a holonomic base (e.g., a base that can move in any direction), or rails on the ceiling, walls, or floors. In additional embodiments, some of the robotic devices may be made fixed within the environment as well. For instance, robotic manipulators can be positioned on elevated bases at different chosen locations within a warehouse.

As used herein, the term "warehouse" may refer to any physical environment in which boxes or objects may be manipulated, processed, and/or stored by robotic devices. In some examples, a warehouse may be a single physical building or structure, which may additionally contain certain fixed components, such as pallet racks for storing pallets of objects. In other examples, some fixed components may be installed or otherwise positioned within the environment before or during object processing. In additional examples, a warehouse may include multiple separate physical structures, and/or may also include physical spaces that are not covered by a physical structure as well.

Further, the term "boxes" may refer to any object or item that can be placed onto a pallet or loaded onto or unloaded from a truck or container. For example, in addition to rectangular solids, "boxes" can refer to cans, drums, tires or any other "simple" shaped geometric items. Additionally, "boxes" may refer to totes, bins, or other types of containers which may contain one or more items for transport or storage. For instance, plastic storage totes, fiberglass trays, or steel bins may be moved or otherwise manipulated by robots within a warehouse. Examples herein may also be applied toward objects other than boxes as well, and toward objects of various sizes and shapes. Additionally, "loading" and "unloading" can each be used to imply the other. For instance, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Within examples, a heterogeneous warehouse robot fleet may be used for a number of different applications. One possible application includes order fulfillment (e.g., for individual customers), in which cases may be opened and individual items from the cases may be put into packaging within boxes to fulfill individual orders. Another possible application includes distribution (e.g., to stores or other warehouses), in which mixed pallets may be constructed containing groups of different types of products to ship to stores. A further possible application includes cross-docking, which may involve transporting between shipping containers without storing anything (e.g., items may be moved from four 40-foot trailers and loaded into three lighter tractor trailers, and could also be palletized). Numerous other applications are also possible.

Referring now to the figures, FIG. 1A depicts a robotic fleet within a warehouse setting, according to an example embodiment. More specifically, different types of robotic devices may form a heterogeneous robotic fleet 100 that may be controlled to collaborate to perform tasks related to the processing of items, objects, or boxes within a warehouse environment. Certain example types and numbers of different robotic devices are shown here for illustration purposes, but robotic fleet 100 may employ more or fewer robotic devices, may omit certain types shown here, and may also include other types of robotic devices not explicitly shown. Additionally, a warehouse environment is shown here with certain types of fixed components and structures, but other types, numbers, and placements of fixed components and structures may be used in other examples as well.

One example type of robotic device shown within robotic fleet 100 is an autonomous guided vehicle (AGV) 112, which may be a relatively small, mobile device with wheels that may function to transport individual packages, cases, or totes from one location to another within the warehouse. Another example type of robotic device is an autonomous fork truck 114, a mobile device with a forklift that may be used to transport pallets of boxes and/or to lift pallets of boxes (e.g., to place the pallets onto a rack for storage). An additional example type of robotic device is a robotic truck loader/unloader 116, a mobile device with a robotic manipulator as well as other components such as optical sensors to facilitate loading and/or unloading boxes onto and/or off of trucks or other vehicles. For instance, robotic truck unloader 116 may be used to load boxes onto delivery truck 118, which may be parked adjacent to the warehouse. In some examples, movements of delivery truck 118 (e.g., to deliver packages to another warehouse) may also be coordinated with robotic devices within the fleet.

Other types of mobile devices than those illustrated here may also be included as well or instead. In some examples, one or more robotic devices may use different modes of transportation besides wheels on the ground. For instance, one or more robotic devices may be airborne (e.g., quadcopters), and may be used for tasks such as moving objects or collecting sensor data of the environment.

In further examples, the robotic fleet 100 may also include various fixed components that may be positioned within the warehouse. In some examples, one or more fixed robotic devices may be used to move or otherwise process boxes. For instance, a pedestal robot 122 may include a robotic arm elevated on a pedestal that is fixed to the ground floor within the warehouse. The pedestal robot 122 may be controlled to distribute boxes between other robots and/or to stack and unstack pallets of boxes. For example, the pedestal robot 122 may pick up and move boxes from nearby pallets 140 and distribute the boxes to individual AGV's 112 for transportation to other locations within the warehouse.

In additional examples, robotic fleet 100 may employ additional fixed components positioned within a warehouse space. For instance, high density storage racks 124 may be used to store pallets and/or objects within the warehouse. The storage racks 124 may be designed and positioned to facilitate interaction with one or more robotic devices within the fleet, such as autonomous fork truck 114. In further examples, certain ground space may be selected and used for storage of pallets or boxes as well or instead. For instance, pallets 130 may be positioned within the warehouse environment at chosen locations for certain periods of time to allow the pallets to be picked up, distributed, or otherwise processed by one or more of the robotic devices.

Figure 1B:
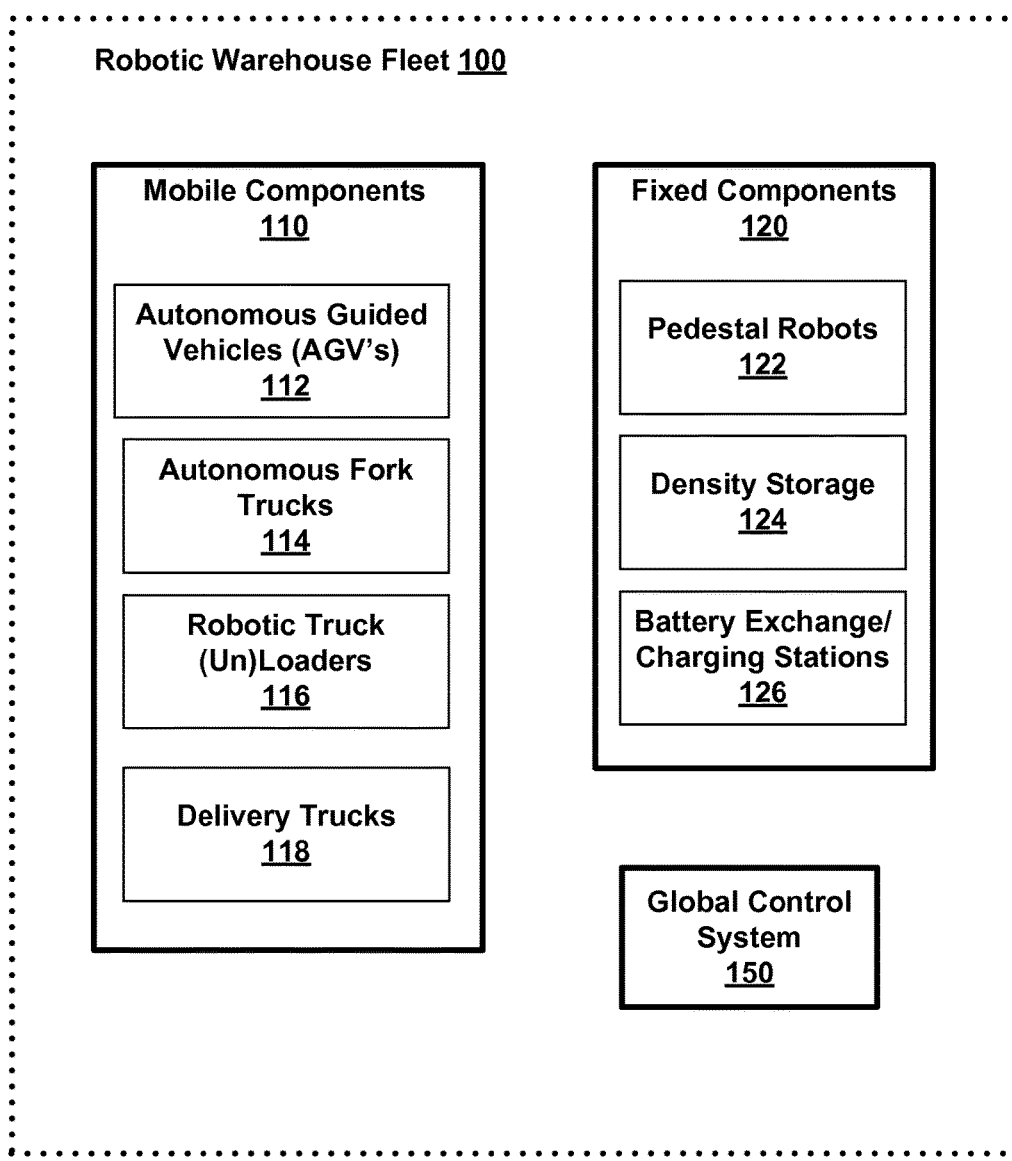
FIG. 1B is a functional block diagram illustrating components of a robotic fleet, according to an example embodiment.

FIG. 1B is a functional block diagram illustrating components of a robotic warehouse fleet 100, according to an example embodiment. The robotic fleet 100 could include one or more of various mobile components, such as AGV's 112, autonomous fork trucks 114, robotic truck loaders/unloaders 116, and delivery trucks 118. The robotic fleet 100 may additionally include one or more fixed components positioned within a warehouse or other environment, such as pedestal robots 122, density storage containers 124, and battery exchange/charging stations 126. In further examples, different numbers and types of the components illustrated within FIG. 1B may be included within a fleet, certain types may be omitted, and additional functional and/or physical components may be added to the examples illustrated by FIGS. 1A and 1B as well. To coordinate actions of separate components, a global control system 150, such as a remote, cloud-based server system, may communicate (e.g., through wireless communication) with some or all of the system components and/or with separate local control systems of individual components.

Within examples, certain of the fixed components 120 may be installed before deployment of the rest of the robotic fleet 100. In some examples, one or more mobile robots may be brought in to map a space before determining placement of certain fixed components 120, such as the pedestal robots 122 or battery exchange stations 126. Once map information is available, the system may determine (e.g., by running simulations) how to layout the fixed components within the space available. In certain cases, a layout may be chosen to minimize the number of fixed components needed and/or the amount of space used by those components. The fixed components 120 and mobile components 110 may be deployed in separate stages or all at once. In additional examples, certain of the mobile components 110 may only be brought in during particular time periods or to complete particular tasks.

In some examples, global control system 150 may include a central planning system that assigns tasks to different robotic devices within fleet 100. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate particular aspects of the geometry and physics of box picking, packing, or storing.

Planning control may also be distributed across individual system components. For example, global control system 150 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

In additional examples, a central planning system may be used in conjunction with local vision on individual robotic devices to coordinate functions of robots within robotic fleet 100. For instance, a central planning system may be used to get robots relatively close to where they need to go. However, it may be difficult for the central planning system to command robots with millimeter precision, unless the robots are bolted to rails or other measured components are used to precisely control robot positions. Local vision and planning for individual robotic devices may therefore be used to allow for elasticity between different robotic devices. A general planner may be used to get a robot close to a target location, at which point local vision of the robot may take over. In some examples, most robotic functions may be position-controlled to get the robots relatively close to target locations, and then vision and handshakes may be used when needed for local control.

In further examples, visual handshakes may enable two robots to identify one another by AR tag or other characteristics, and to perform collaborative operations within fleet 100. In additional examples, items (e.g., packages to be shipped) may be provided with visual tags as well or instead, which may be used by robotic devices to perform operations on the items using local vision control. In particular, the tags may be used to facilitate manipulation of the items by the robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual robots within the fleet and/or from external sources. Strategies may then be refined over time to enable the fleet to use less space, less time, less power, less electricity, or to optimize across other variables. In some examples, optimizations may span across multiple warehouses, possibly including other warehouses with robotic fleets and/or traditional warehouses. For instance, global control system 150 may incorporate information about delivery vehicles and transit times between facilities into central planning.

In some examples, a central planning system may sometimes fail, such as when a robot gets stuck or when packages get dropped in a location and lost. Local robot vision may also therefore provide robustness by inserting redundancy to handle cases where the central planner fails. For instance, as an automatic pallet jack passes and identifies an object, the pallet jack may send information up to a remote, cloud-based server system. Such information may be used to fix errors in central planning, help to localize robotic devices, or to identify lost objects.

In further examples, a central planning system may dynamically update a map of the physical environment containing robotic fleet 100 and objects undergoing processing by the robotic devices. In some examples, the map may be continuously updated with information about dynamic objects (e.g., moving robots and packages moved by robots). In additional examples, a dynamic map could contain information on both the current configuration or placement of components within a warehouse (or across multiple warehouses) as well as information about what is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out).

In additional examples, some or all of the robots may scan for labels on objects at different points within the process. The scans may be used to look for visual tags that may be applied to individual components or specific items to facilitate finding or keeping track of components and items. This scanning may yield a trail of items constantly moving around as the items are manipulated or transported by robots. A potential benefit is added transparency, both on the supplier side and the consumer side. On the supplier side, information about current locations of inventory may be used to avoid overstocking and/or to move items or pallets of items to different locations or warehouses to anticipate demand. On the consumer side, the information about current locations of particular items may be used to determine when a particular package will be delivered with improved accuracy.

In some examples, some or all of the mobile components 110 within robotic fleet 100 may periodically receive charged batteries from a battery exchange station 126 equipped with multiple battery chargers. In particular, the station 126 may replace a mobile robot's old batteries with recharged batteries, which may prevent robots from having to sit and wait for batteries to charge. The battery exchange station 126 may be equipped with a robotic manipulator such as a robotic arm. The robotic manipulator may remove batteries from an individual mobile robot and attach the batteries to available battery chargers. The robotic manipulator may then move charged batteries located at the station 126 into the mobile robot to replace the removed batteries. For instance, an AGV 112 with a weak battery may be controlled to move over to battery exchange station 126 where a robotic arm pulls a battery out from the AGV 112, puts the battery in a charger, and gives the AGV 112 a fresh battery.

In further examples, battery exchanges may be scheduled by a central planning system. For instance, individual mobile robots may be configured to monitor their battery charge status. The robots may periodically send information to the central planning system indicating the status of their batteries. This information may then be used by the central planning system to schedule battery replacements for individual robots within the fleet when needed or convenient.

In some examples, a fleet 100 may contain a number of different types of mobile components 110 that use different types of batteries. A battery exchange station 126 may therefore be equipped with different types of battery chargers for different types of batteries and/or mobile robots. The battery exchange station 126 may also be equipped with a robotic manipulator that can replace batteries for different types of robots. In some examples, mobile robots may have battery containers containing multiple batteries. For instance, an autonomous fork truck 114 such as a pallet jack may have a steel bucket with 3 or 4 batteries. The robotic arm at the station 126 may be configured to lift out the entire bucket of batteries and attach individual batteries to battery chargers on a shelf at the station 126. The robotic arm may then find charged batteries to replace the old batteries, and move those batteries back into the bucket before reinserting the bucket into the pallet jack.

In further examples, global control system 150 and/or a separate control system of the battery exchange station 126 may also automate battery management strategies. For instance, each battery may have a barcode or other identifying mark so that the system can identify individual batteries. A control system of the battery exchange station 126 may count how many times individual batteries have been recharged (e.g., to determine when to change water or empty batteries completely). The control system may also keep track of which batteries have spent time in which robotic devices, how long the batteries took to recharge at the station 126 in the past, and other relevant properties for efficient battery management. This battery usage information may be used by the control system to select batteries for the robotic manipulator to give to particular mobile robots.

In additional examples, a battery exchange station 126 may also involve a human operator in some cases. For instance, the station 126 could include a rig where people can safely perform manual battery changing or deliver new batteries to the station for deployment into the fleet 100 when necessary.

FIGS. 2A-2D illustrate several examples of robotic devices that may be included within a robotic warehouse fleet. Other robotic devices which vary in form from those illustrated here as well as other types of robotic devices may also be included.

Figure 2A:
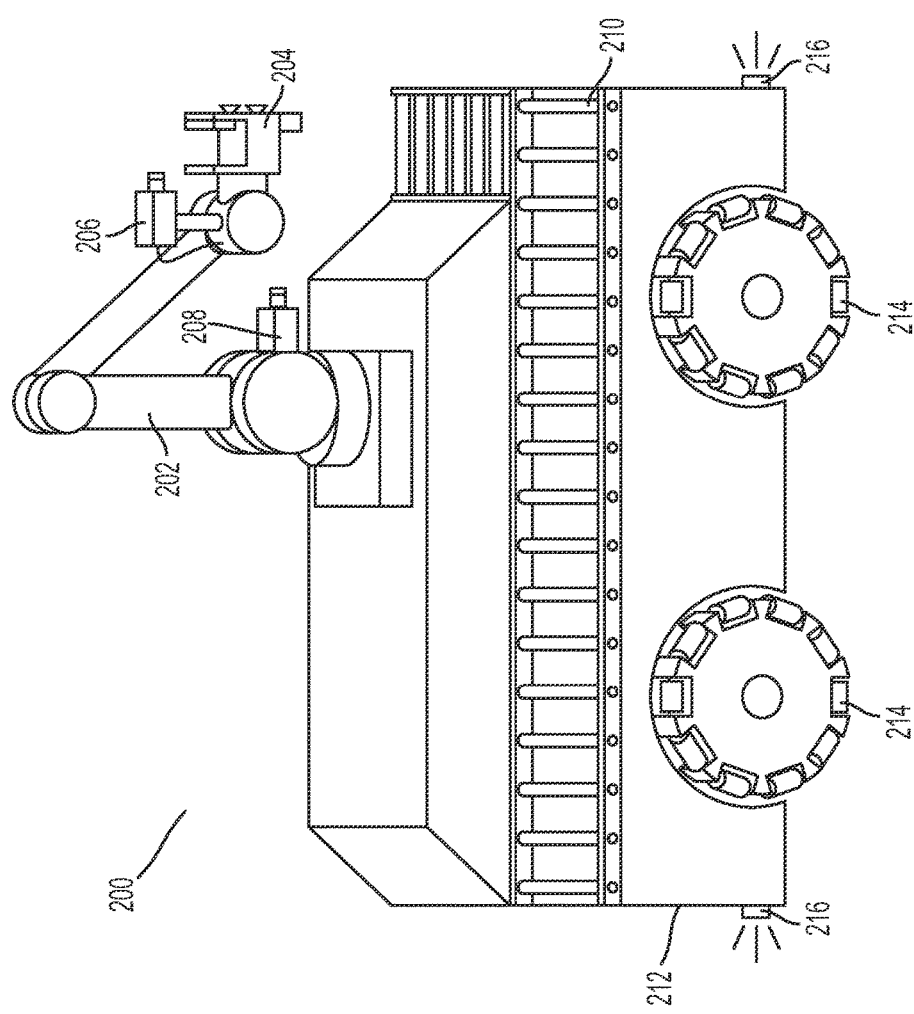
FIG. 2A shows a robotic truck unloader, according to an example embodiment.

FIG. 2A illustrates a robotic truck unloader, according to an example embodiment. In some examples, a robotic truck unloader may include one or more sensors, one or more computers, and one or more robotic arms. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

The robotic truck unloader 200 may include a robotic arm 202 with a gripping component 204 for gripping objects within the environment. The robotic arm 202 may use the gripping component 204 to pick up and place boxes to load or unload trucks or other containers. The truck unloader 200 may also include a moveable cart 212 with wheels 214 for locomotion. The wheels 214 may be holonomic wheels that allow the cart 212 to move with two degrees of freedom. Additionally, a wrap around front conveyor belt 210 may be included on the holonomic cart 212. In some examples, the wrap around front conveyor belt may allow the truck loader 200 to unload or load boxes from or to a truck container or pallet without having to rotate gripper 204.

In further examples, a sensing system of robotic truck unloader 200 may use one or more sensors attached to a robotic arm 202, such as sensor 206 and sensor 208, which may be two-dimensional (2D) sensors and/or 3D depth sensors that sense information about the environment as the robotic arm 202 moves. The sensing system may determine information about the environment that can be used by a control system (e.g., a computer running motion planning software) to pick and move boxes efficiently. The control system could be located on the device or could be in remote communication with the device. In further examples, scans from one or more 2D or 3D sensors with fixed mounts on a mobile base, such as a front navigation sensor 216 and a rear navigation sensor 218, and one or more sensors mounted on a robotic arm, such as sensor 206 and sensor 208, may be integrated to build up a digital model of the environment, including the sides, floor, ceiling, and/or front wall of a truck or other container. Using this information, the control system may cause the mobile base to navigate into a position for unloading or loading.

In further examples, the robotic arm 202 may be equipped with a gripper 204, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

The truck unloader 200 may additionally include a motor, which may be an electric motor powered by electrical power, or may be powered by a number of different energy sources, such as a gas-based fuel or solar power. Additionally, the motor may be configured to receive power from a power supply. The power supply may provide power to various components of the robotic system and could represent, for example, a rechargeable lithium-ion or lead-acid battery. In an example embodiment, one or more banks of such batteries could be configured to provide electrical power. Other power supply materials and types are also possible.

Figure 2B:
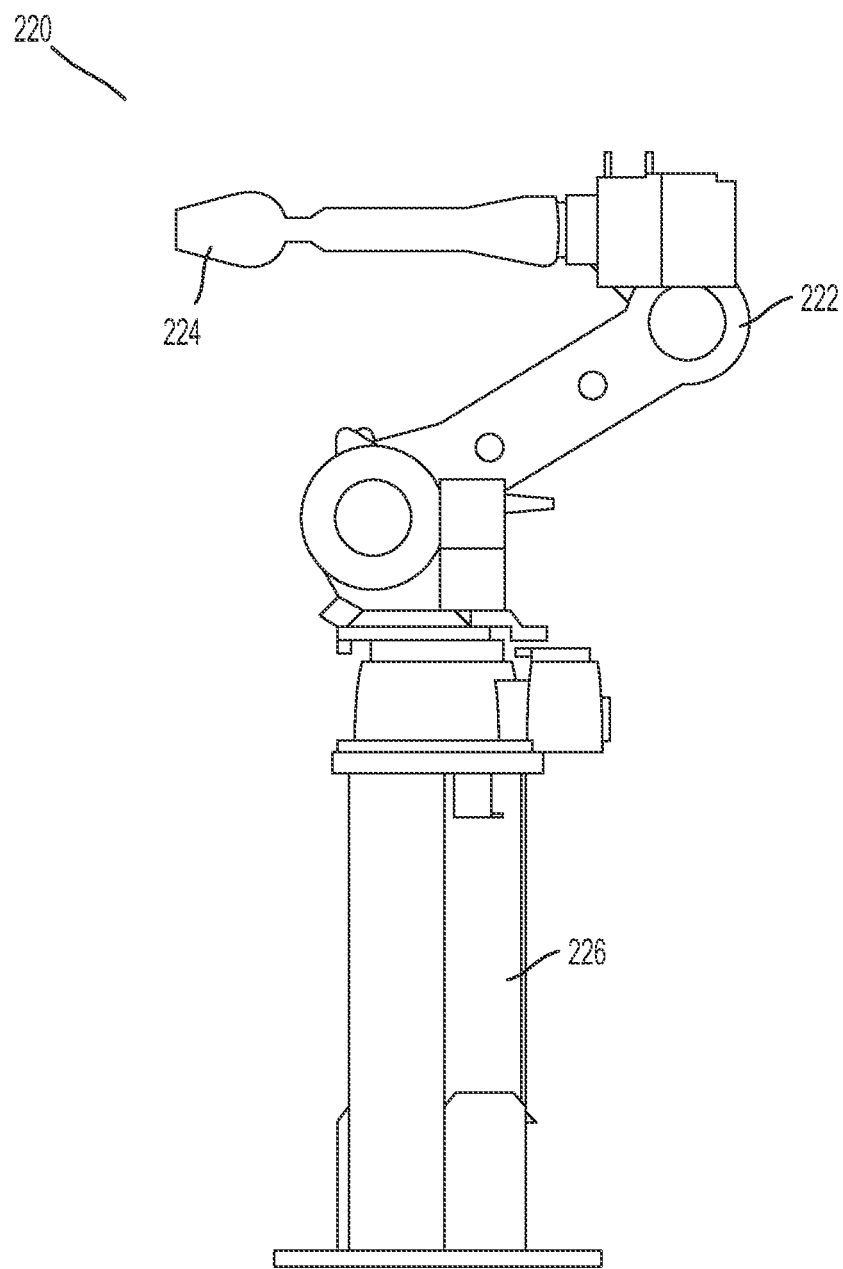
FIG. 2B shows a robotic arm on a pedestal, according to an example embodiment.

FIG. 2B illustrates a robotic arm on a pedestal, according to an example embodiment. More specifically, pedestal robot 220 may be positioned within an environment such as a warehouse environment and used to pick up, move, and/or otherwise manipulate objects within reach. In some examples, the pedestal robot 220 may be specialized for heavy lifting without requiring batteries to operate. The pedestal robot 220 may include a robotic arm 222 with an end-effector-mounted gripper 224, which may be of the same type as the robotic manipulator 202 and gripper 204 described with respect to the robotic truck unloader 200. The robotic arm 222 may be mounted on a pedestal 226, which may allow the robotic arm 222 to easily pick up and move nearby packages, such as to distribute packages between different mobile robots. In some examples, the robotic arm 222 may also be operable to construct and/or deconstruct pallets of boxes. In additional examples, the pedestal 226 may include an actuator to allow a control system to change the height of the robotic arm 222.

In further examples, a bottom surface of the pedestal robot 220 may be a pallet-shaped structure. For instance, the bottom surface may have dimension and shape roughly equivalent to other pallets used for object transport or storage within a warehouse. By shaping the bottom of the pedestal robot 220 as a pallet, the pedestal robot 220 may be picked up and moved to different locations within a warehouse environment by a pallet jack or different type of autonomous fork truck. For instance, when a delivery truck arrives at a particular docking port of the warehouse, a pedestal robot 220 may be picked up and moved to a location closer to the delivery truck to more efficiently process boxes coming from or going to the delivery truck.

In additional examples, the pedestal robot 220 may also include one or more visual sensors to identify boxes and/or other robotic devices within the vicinity of the pedestal robot 220. For instance, a control system of the pedestal robot 220 or a global control system may use sensor data from sensors on the pedestal robot 220 to identify boxes for the robotic arm 222 and gripper 224 of the pedestal robot 220 to pick up or manipulate. In further examples, the sensor data may also be used to identify mobile robotic devices in order to determine where to distribute individual boxes. Other types of robotic fixed manipulation stations may also be used within a heterogeneous robotic fleet as well.

Figure 2C:
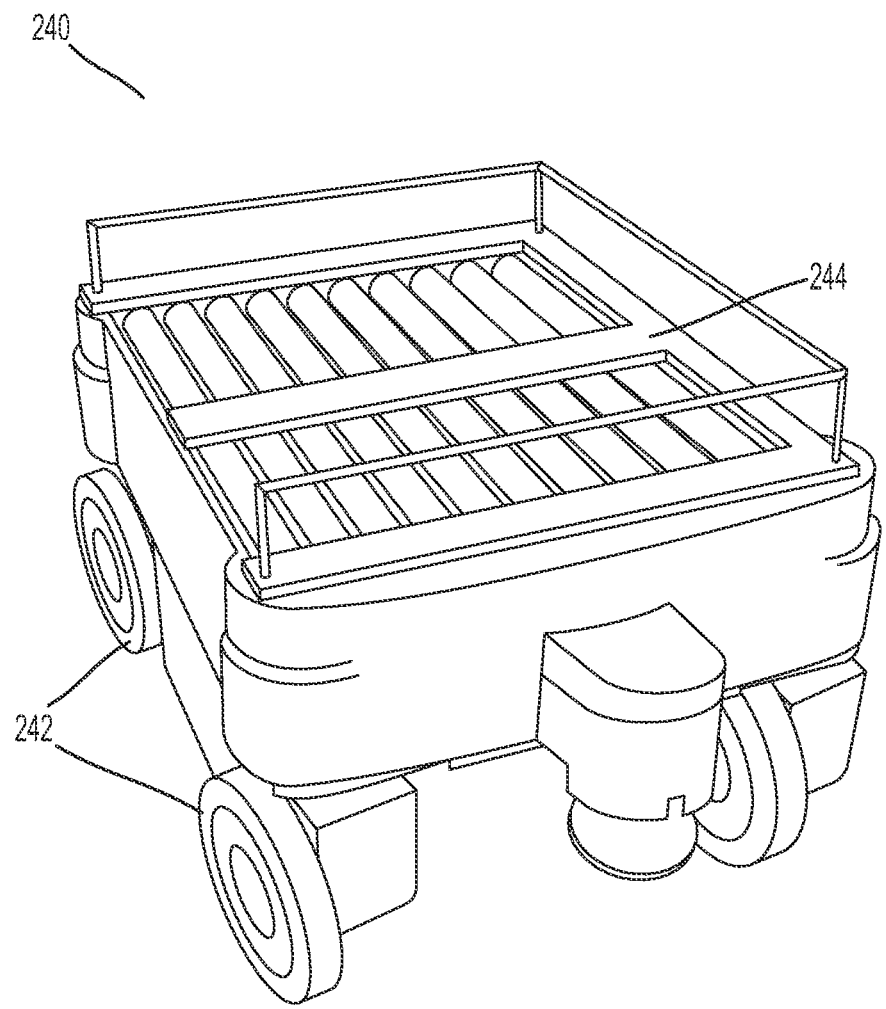
FIG. 2C shows an autonomous guided vehicle, according to an example embodiment.

FIG. 2C shows an autonomous guided vehicle (AGV), according to an example embodiment. More specifically, AGV 240 may be a relatively small, mobile robotic device that is capable of transporting individual boxes or cases. The AGV 240 may include wheels 242 to allow for locomotion within a warehouse environment. Additionally, a top surface 244 of the AGV 240 may be used to places boxes or other objects for transport. In some examples, the top surface 244 may include rotating conveyors to move objects to or from the AGV 240. In additional examples, the AGV 240 may be powered by one or more batteries that can be quickly recharged at a battery charging station and/or exchanged for fresh batteries at a battery exchange station. In further examples, the AGV 240 may additionally include other components not specifically identified here, such as sensors for navigation. AGVs with different shapes and sizes also may be included within a robotic warehouse fleet, possibly depending on the types of packages handled by a warehouse.

Figure 2D:
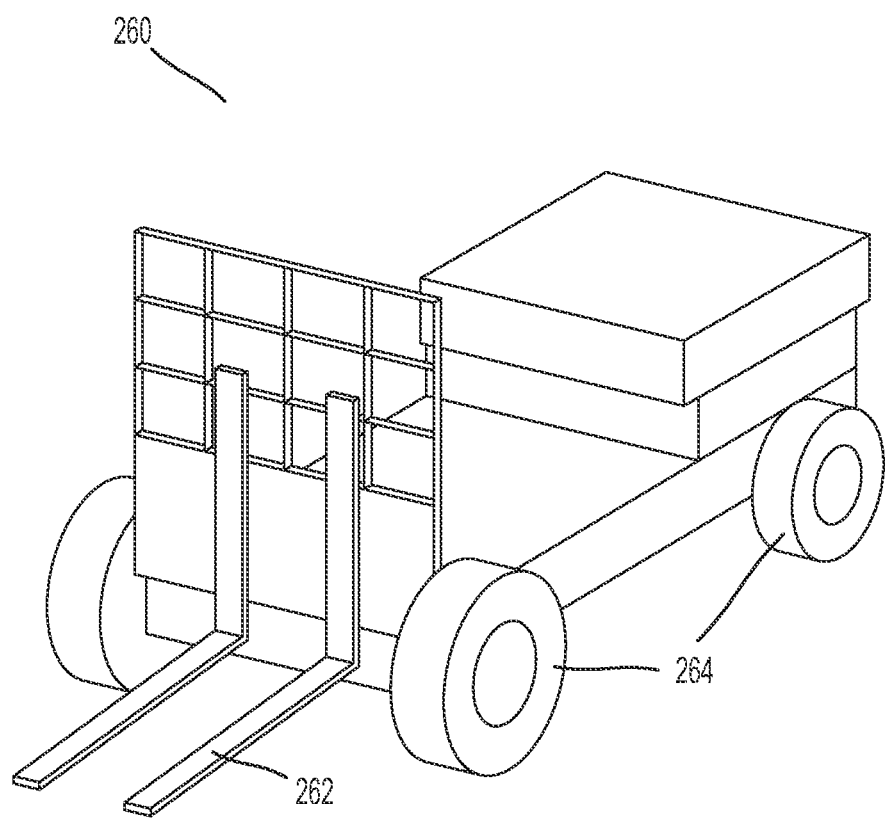
FIG. 2D shows an autonomous fork truck, according to an example embodiment.

FIG. 2D shows an autonomous fork truck, according to an example embodiment. More specifically, autonomous fork truck 260 may include a forklift 262 for lifting and/or moving pallets of boxes or other larger materials. In some examples, the forklift 262 may be elevated to reach different racks of a storage rack or other fixed storage structure within a warehouse. The autonomous fork truck 260 may additionally include wheels 264 for locomotion to transport pallets within the warehouse. In additional examples, the autonomous fork truck may include a motor and power supply as well as a sensing system, such as those described with respect to robotic truck unloader 200. The autonomous fork truck 260 may also vary in size or shape from the one illustrated in FIG. 2D.

Figure 3:
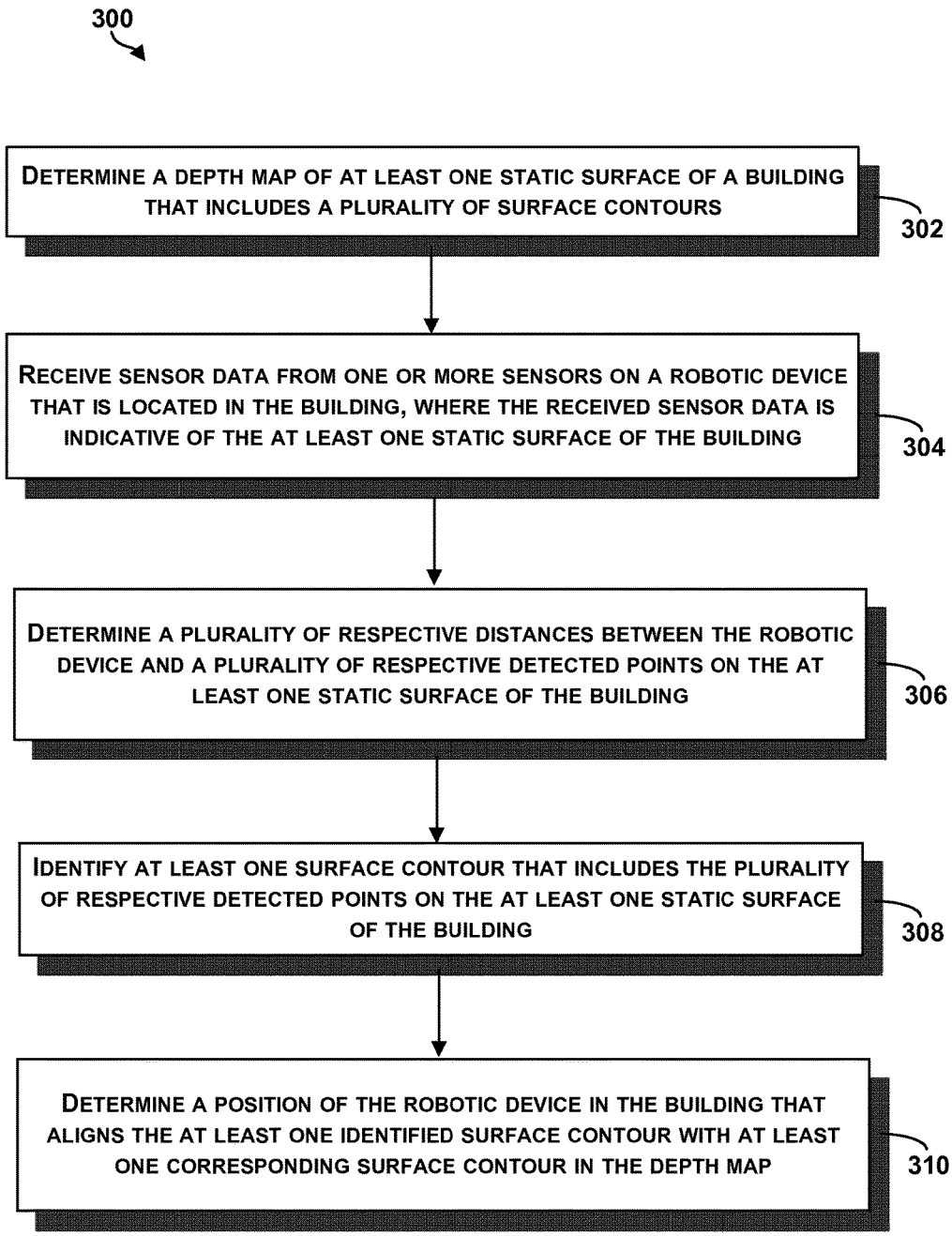
FIG. 3 is a block diagram of a method, according to an example embodiment.

FIG. 3 illustrates a flowchart showing a method 300 that may allow for localization of and/or navigation by a robotic device, according to an example embodiment. Method 300 may be carried out by a local control system of mobile robotic device, such as any of the mobile robotic devices illustrated and described previously with respect to FIGS. 1A-1B and/or 2A-2D. In further examples, method 300 may be executed by a control system of a number of different possible types of mobile autonomous devices or vehicles as well. Additionally, part or all of method 300 may be executed by a remote control system in communication with one or more robotic devices as well, such as global control system 150 as described with respect to FIG. 1B.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 3. Where used, program code can be stored on any type of computer-readable medium, for example, such as a storage device including a disk or hard drive.

In addition, each block of the flowchart shown in FIG. 3 may represent circuitry that is wired to perform the specific logical functions in the process. Unless specifically indicated, functions in the flowchart shown in FIG. 3 may be executed out of order from that shown or discussed, including substantially concurrent execution of separately described functions, or even in reverse order in some examples, depending on the functionality involved, so long as the overall functionality of the described method is maintained.

As shown by block 302 of FIG. 3, method 300 may involve determining a depth map of at least one static surface of a building, according to an example embodiment. More specifically, a building in which one or more robots are operating may have one or more surfaces with contours that can be mapped out using sensor data from one or more depth cameras or other types of depth sensors. The building may be any building with at least one static surface, which is a surface that does not change over a certain period of time, or changes infrequently. The surface may therefore provide a stable reference point for localization. For example, the at least one static surface could be a ceiling of a building like a warehouse. In other examples, side walls or other surfaces with varying depth texture could be mapped as well or instead. Additionally, the building could be another type of building that includes one or more stable surfaces with mappable contours, including factories, residential buildings, agricultural building, or office buildings.

A depth map includes indications of depth at different points on the surface. The depth map of a building surface may include a plurality of contours which may be used by a robot for localization and/or navigation. A surface contour includes a group of connected points on the surface representative of the depth of the surface at each of the points. More specifically, surface contours represent depth outlines of one or more features of a surface of the building. Surface features with irregular or curving shapes may be particularly helpful for robotic localization.

In some examples, some of the contours may correspond to components attached to the surface, such as ductwork, rafters, lighting fixtures, wiring, or pipes. In other examples, some of the contours may correspond to the shape of the surface itself as well or instead. For instance, a building may have a curved or arching ceiling, or a ceiling with two or more planes aligned at different angles to one another. Some of the contours may be connected points with the same depth (e.g., the outline of the outer edge of a ceiling light). Other contours may be connected points with depth that changes in a linear way, or according to some predictable function (e.g., a part of a ceiling that curves with a consistent degree of curvature).

The depth map may be generated based on data from one or more depth sensors directed at the building surface, such as sensors that use stereo, structured light, or time-of-flight techniques to measure range to detected surfaces. In some examples, the depth map may initially be generated based on sensor data from one or more depth sensors on a mapping robot that is commanded to navigate through the building. Additionally, the depth sensors used by the mapping robot may be more expensive and precise than those used later by one or more robots for localization. Accordingly, coarser depth sensor data may be used to identify contours once the contours are mapped out with greater precision within the depth map.

Figure 4A:
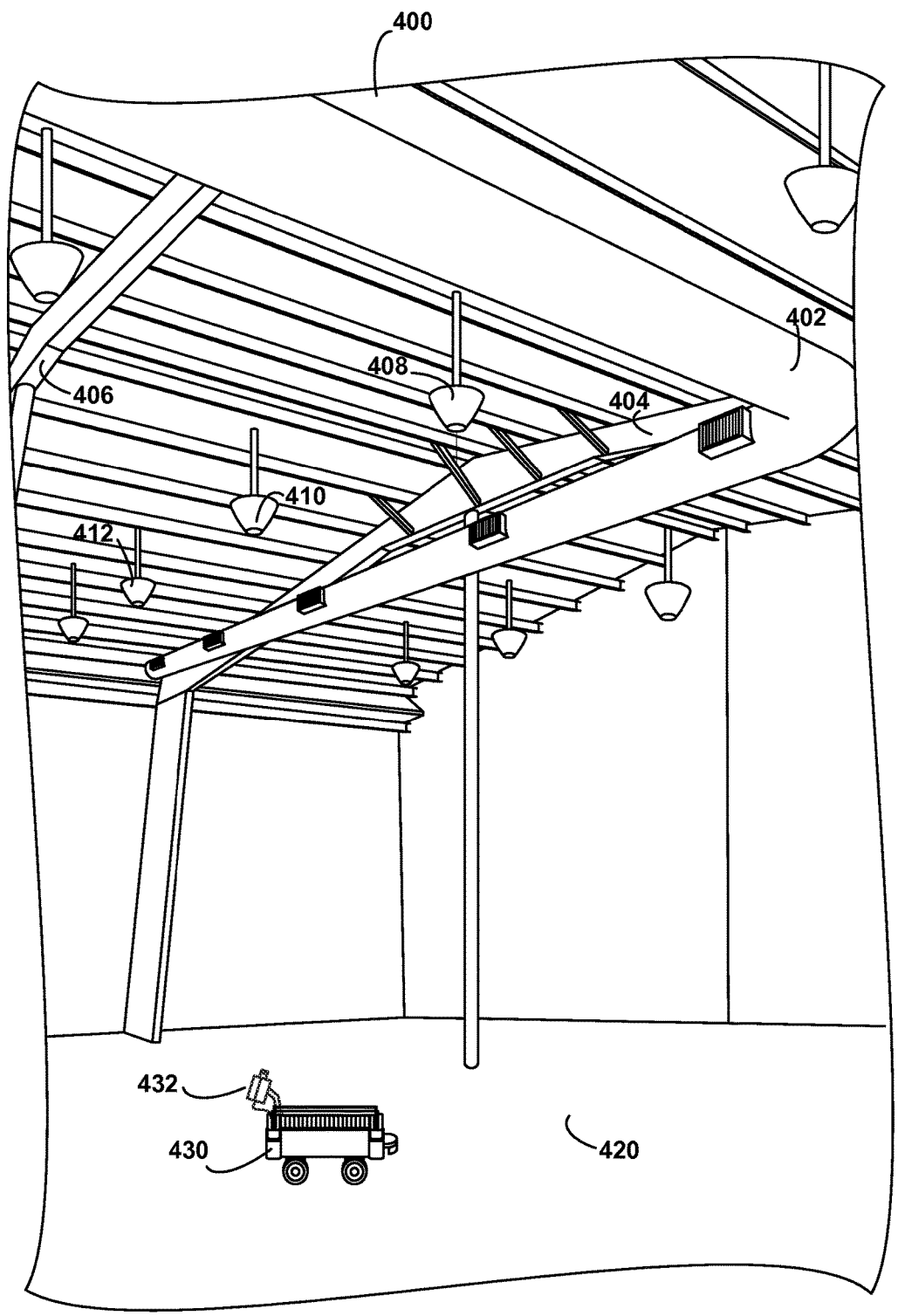
FIG. 4A illustrates a mobile robot within a building, according to an example embodiment.

FIG. 4A illustrates a robotic device within a building, according to an example embodiment. More specifically, a building may have a ceiling 400 with varying depth texture that may be used for robotic localization. The ceiling 400 shown here has a number of attached components with different shapes and contours, including an air duct 402, cross beams 404, 406, and light fixtures 408, 410, 412. These surface features are provided here for purposes of illustration. Example systems and methods described herein could be used with any number of different types of building surfaces with different types of features that may provide identifiable contours as well.

A mobile robotic device 430 is illustrated with at least one depth camera 432 directed towards ceiling 400. The robot 430 may be a mapping robot that is used to generate a depth map of ceiling 400 with depth sensor data from depth sensor 432. The robot 430 may navigate along the floor 420 of the building in order to collect depth measurements to generate a depth map. As shown, the floor 420 is located under ceiling 400, and may also be parallel to the ceiling 400. In a scenario where one or more robots will be operating by moving along the floor 420, the location of ceiling 400 relative to the floor 420 may provide a stable and unoccluded reference point for robotic localization.

Figure 4B:
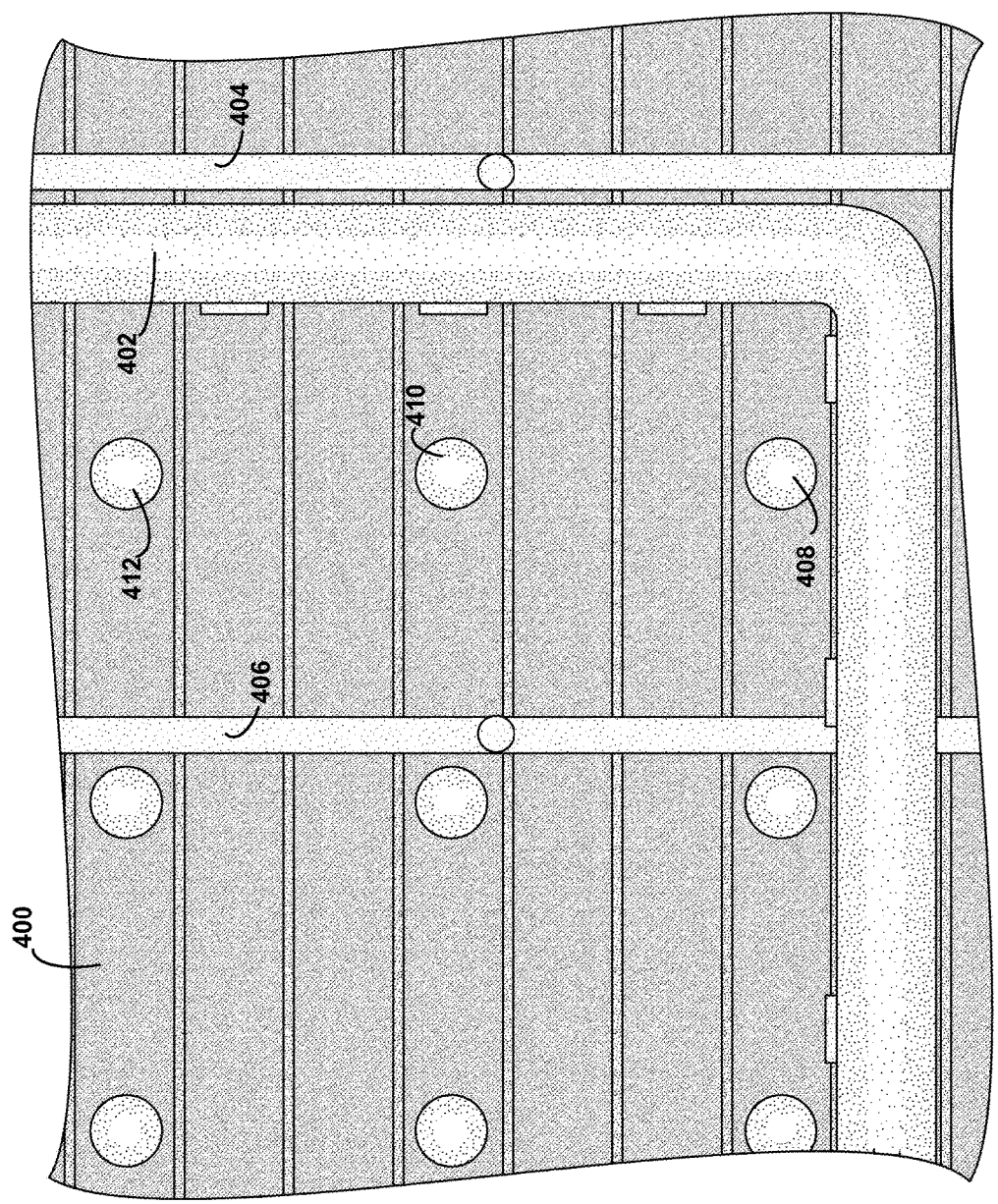
FIG. 4B illustrates a depth map of a building ceiling, according to an example embodiment.

FIG. 4B illustrates a depth map of a building surface, according to an example embodiment. More specifically, the depth map illustrates depth of different points on the ceiling 400 of the building illustrated in FIG. 4A. Darker areas shown with greater point density are further away when viewed from the floor of the building, and lighter areas with lower point density are closer. As shown here, certain surface contours on the ceiling 400 may be distinguished because components are mounted at different heights from the ceiling 400. For instance, contours may correspond to the outer edges of air duct 402, cross beams 404, 406, and lighting fixtures 408, 410, 412 that separate those features from the ceiling background on the depth map.

Additionally, some contours may be identified within the depth map based on the shape or curvature of individual components or groups of connected components. For instance, as illustrated here, the air duct 402 may have changing depth along the surface as the points in the middle of the air duct 402 are closer to the floor than the points along the edge. Further, the lighting fixtures 408, 410, 412 may also have changing depth along the surface as the shapes of the lights extend upwards toward the ceiling from the centers of the lights. Depending on available granularity of depth sensor data, more particular features could be included contours for localization as well. For instance, the vents on the side of the air duct 402 could form separate contours or portions of contours corresponding to the duct itself. In some examples with very precise measurements available, subtle ceiling textures, such as ribs or popcorn texture, could also form contours for matching as well.

In some examples, one or more contours may be identified as the map is generated. In other examples, contours may not be specifically identified until depth data is available at a later point in time for contour matching. For instance, the general area on the surface from which data is available as well as the level of granularity of collected data may be used to determine which groups of connected points on the depth form the contours to look for within the collected data as part of a localization process for a particular robot.

Referring back to FIG. 3, method 300 further involves receiving sensor data from one or more sensors on a robotic device within the building, according to an example embodiment. More specifically, a mobile robot may collect data from one or more sensors directed towards the surface as the robot is operating. Different types and numbers of sensors may be used. In some examples, the robot use may two or more fixed depth sensors oriented in different directions to provide different views of the surface for collection of depth data. For instance, a robot may be equipped with three laser rangefinders angled upward in order to collect data from different areas on the ceiling. Laser rangefinders may provide a cost-effective and illumination-resistant method of collecting data to identify surface contours.

In some examples, the one or more sensors on the robot may be fixed in orientation on the robot. Sensor data may then be collected by making multiple observations over time. More specifically, data is collected from different points on the ceiling by collecting the data at consecutive points in time as the robot moves within the building. For instance, a robot with a single beam laser distance sensor can sample multiple distance observations while traveling in a straight line. In other examples, the sensors themselves may be controlled to change orientation periodically or continuously.

In additional examples, the sensors on the robot may be oriented in a manner that is expected to provide one or more unobstructed views of the surface on the building. For instance, a robot may operate within a warehouse with a number of pallet racks of a certain height. The sensors on the robot may then be oriented at angles close enough to vertical that they will not be obstructed by the pallet racks even when the robot is next to one of the pallet racks. In other examples, the robot may determine when a sensor's view of the ceiling is obstructed (e.g., based on depth data indicating an object much closer to the robot than the ceiling). The robot may then reorient the sensor in an effort to obtain an unobstructed view of the ceiling for localization.

Method 300 further involves determining distances between the robotic device and detected points on the surface of the building, as shown by block 306 of FIG. 3. More specifically, distances may be measured based on the sensor data from the sensors to different points on the ceiling as the robot operates within the building. The position and orientation of the sensors on the robot may then be used to determine how far the detected points are from the robot. These distances may be used to determine a position of the robot within the building once one or more contours are identified within the collected sensor data and aligned with corresponding contours on the depth map of the ceiling.

In some examples, distance measurements from the robot to the ceiling may be determined periodically as the robot moves within the building. For instance, a distance measurement may be collected by each sensor on the robot once a second. As another example, a distance measurement may be collected by each sensor on the robot every time that the robot changes position within the building by more than a threshold amount.

In additional examples, the orientation of the robot itself may change as it is moving within the building. For instance, a robot with wheels may be pitching or rolling as it drives. To account for these changes in orientation, an internal measurement unit (IMU) on the robot may be used to determine the orientation of the robot itself. Distances measurements between the robot and the ceiling may then be adjusted to account for the orientation of the robot when particular pieces of sensor data from the ceiling were collected.

Figure 4C:
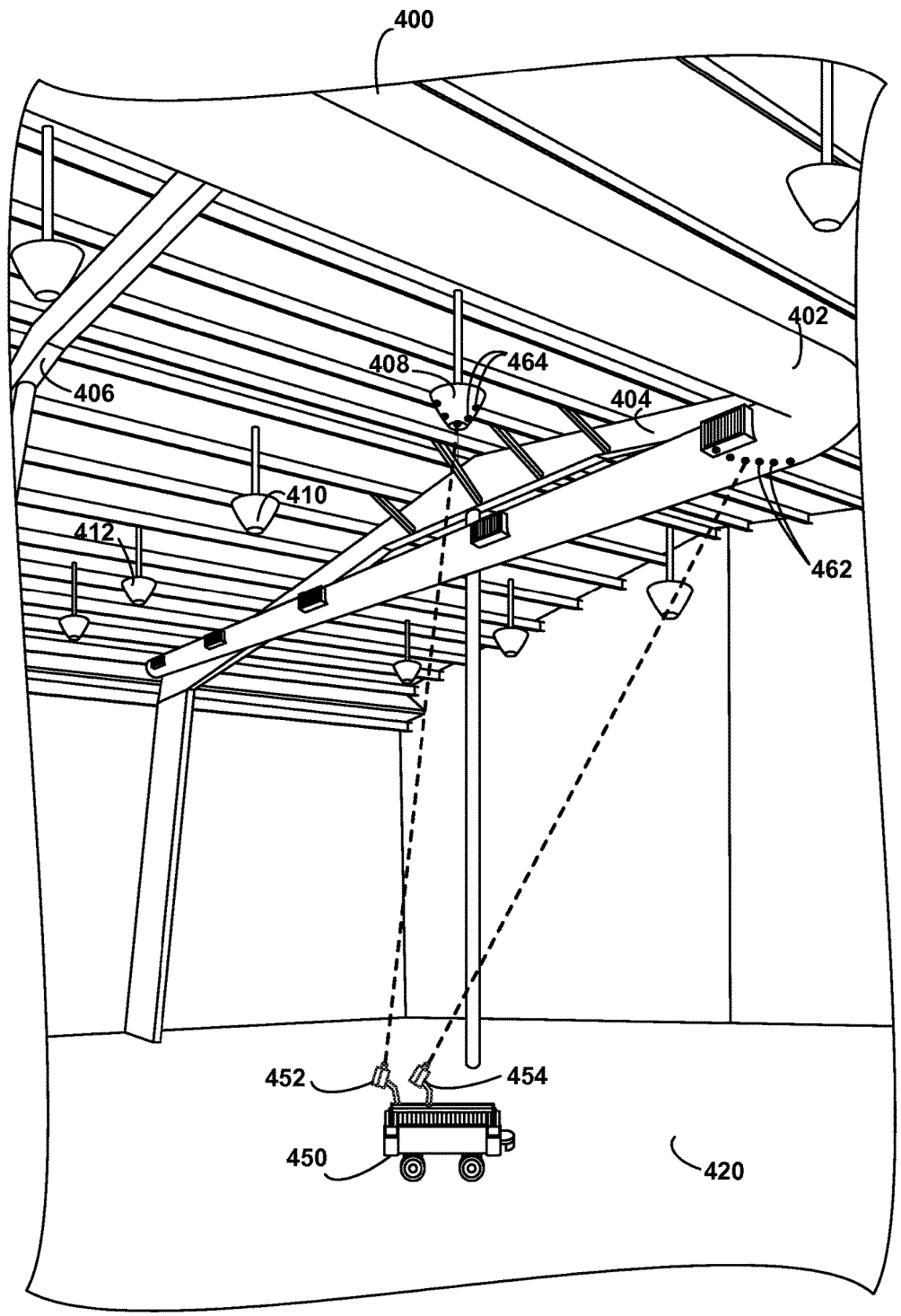
FIG. 4C illustrates another mobile robot within a building, according to an example embodiment.

FIG. 4C illustrates another robot within a building, according to an example embodiment. More specifically, mobile robot 450 may be equipped with sensors 452, 454 that are oriented to detect different points on ceiling 400 for purposes of localizing robot 450 within the building. In some examples, robot 450 may be navigating within the building at a point in time after a depth map of the ceiling 400 was generated by a different robot 430, as described with respect to FIGS. 4A-4B. Additionally, sensors 452, 454 may be less expensive sensors (e.g., laser rangefinders) than those used to generate the depth map. For instance, an entire fleet of robots operating within a building may be equipped in a cost-effective manner with laser sensors to detect ceiling points for localization and/or navigation.

As shown in FIG. 4C, a first sensor 452 on the robot 450 may detect a number of points 464 as the first sensor 452 is directed at a particular orientation towards the ceiling 400. In this case, the detected points 464 may be representative of points on the surface of lighting fixture 408. Based on the sensor data from first sensor 452, distances between of the detected points 464 and the robot 450 may be determined. The measured locations of detected points 464 may be used to identify surface contours. For instance, the distances to each of the points 464 may indicate the shape of lighting fixture 408. Additionally, distances to detected points on the ceiling 400 itself on either side of the points 464 on lighting fixture 408 may also indicate an outer boundary of lighting fixture 408. The surface shape and/or boundary of lighting fixture 408 may be used as a surface contour by robot 450 for localization.

Additionally, a second sensor 454 on robot 450 may detect a separate set of points 462 while the second sensor 454 is oriented in a different direction towards ceiling 400. More specifically, the points 462 may be representative of an air duct 402 attached to the ceiling 400. By orienting the second sensor 454 in a different upward direction, additional data points may be collected to identify additional contours for more precise localization. In this case, separate distances from the robot 450 to the detected points 462 on the air duct 402 may be determined using sensor data from the second sensor 454. These distances may be used to identify one or more surface contours based on the shape and size of air duct 402. Notably, contours may be identified as abstract shapes and curves without the need to particularly identify that a detected object is an air duct or any other type of object.

Referring back to FIG. 3, method 300 may further involve identifying at least one depth contour that includes the detected points on the surface of the building, as shown by block 308. More specifically, detected points that fall within one or more contours stored in the map may be identified by looking for matching shapes, curves, and/or changes in depth. In some examples, just one uniquely identifiable surface contour may be identified from sensor data and used to align the position of the robot with the depth map. In other examples, contours in different areas on the ceiling or other surface may each be identified from sensor data collected by the robot from the different areas. Identifying multiple contours may provide improved precision as well as redundancy. Multiple contours may also enable accurate localization when the surface has certain repeating contours (e.g., resulting from a number of identical features that are positioned at multiple points on the surface).

Figure 4D:
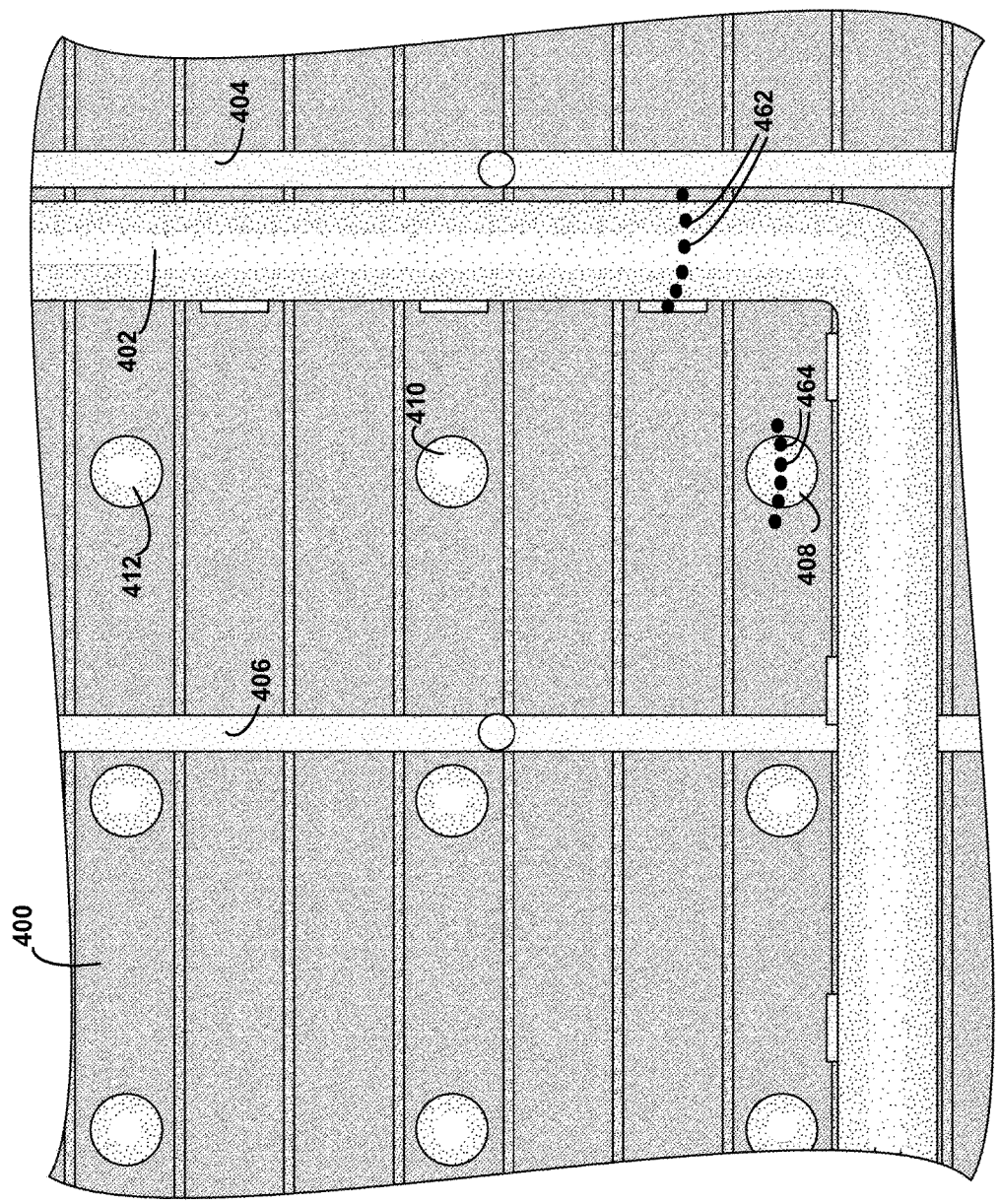
FIG. 4D illustrates a depth map of a building ceiling with a number of detected points, according to an example embodiment.

FIG. 4D illustrates a depth map of a building surface with a number of detected points, according to an example embodiment. More specifically, detected points 464 are aligned with a section of the depth map that includes lighting fixture 408. Additionally, detected points 462 are aligned with a section of the depth map that includes air duct 402. In order to determine where the detected points should be aligned in the depth map, one or more contours which contain some of the detected points may be identified.

For instance, in reference to detected points 464, one contour corresponds to the outer boundary of lighting fixture 408. In this case, a contour line around the edge of lighting fixture 408 indicates both the area covered by the lighting fixture 408 on the depth map as well as the depth difference between lighting fixture 408 and the ceiling 400 directly above it. The contour line includes points of equal depth around the circle. Further, one or more contours may correspond to the shape of the lighting fixture 408 itself. More specifically, the lighting fixture 408 may be shaped like a frustum of a cone with the lowest points from the ceiling in the center. A surface contour follows this shape from one edge of the light to the other. Contours showing the changing surface depth from the lighting fixture 408, including the area, surface curves, and/or depth difference from the ceiling, may be used in order to align the detected points 464 at a position which corresponds to the contours on the depth map.

Additionally, in reference to detected points 462, one contour corresponds to the outer boundary of air duct 402. A contour line around the boundary of air duct indicates both the width spanned by the air duct 402 on the depth map as well as the depth difference between air duct 402 and the ceiling 400 directly above it. Another surface contour includes the shape and depth of the nearby vent attached to the air duct 402. Additionally, another contour includes the curved shape of the air duct 402. Contours showing the changing surface depth resulting from the air duct 402, including the width, surface curves, and/or depth differences, may be used in order to align the detected points 462 at a position which corresponds to the contours on the depth map.

Referring back to FIG. 3, method 300 may further involve determining a position of the robotic device in the building that aligns at least one identified surface contour with at least one corresponding surface contour in the depth map, as shown by block 310. More specifically, identified surface contours that contain detected points are matched to surface contours in the depth map. Then, distances from the robot to those detected points may be used to determine a location of the robot relative to the depth map. A lateral distance from the robot to a particular detected point may be determined based on the angle of the sensor that detected the point and the corresponding distance to the detected point indicated by the sensor. For instance, a ray to a detected point on the ceiling may be projected onto the floor based on the angle between the robot and the detected point. This lateral distance indicates where the robot is positioned relative to the depth map. Multiple distances to different detected points and/or different contours may be used to more precisely align the robot with the map.

Figure 4E:
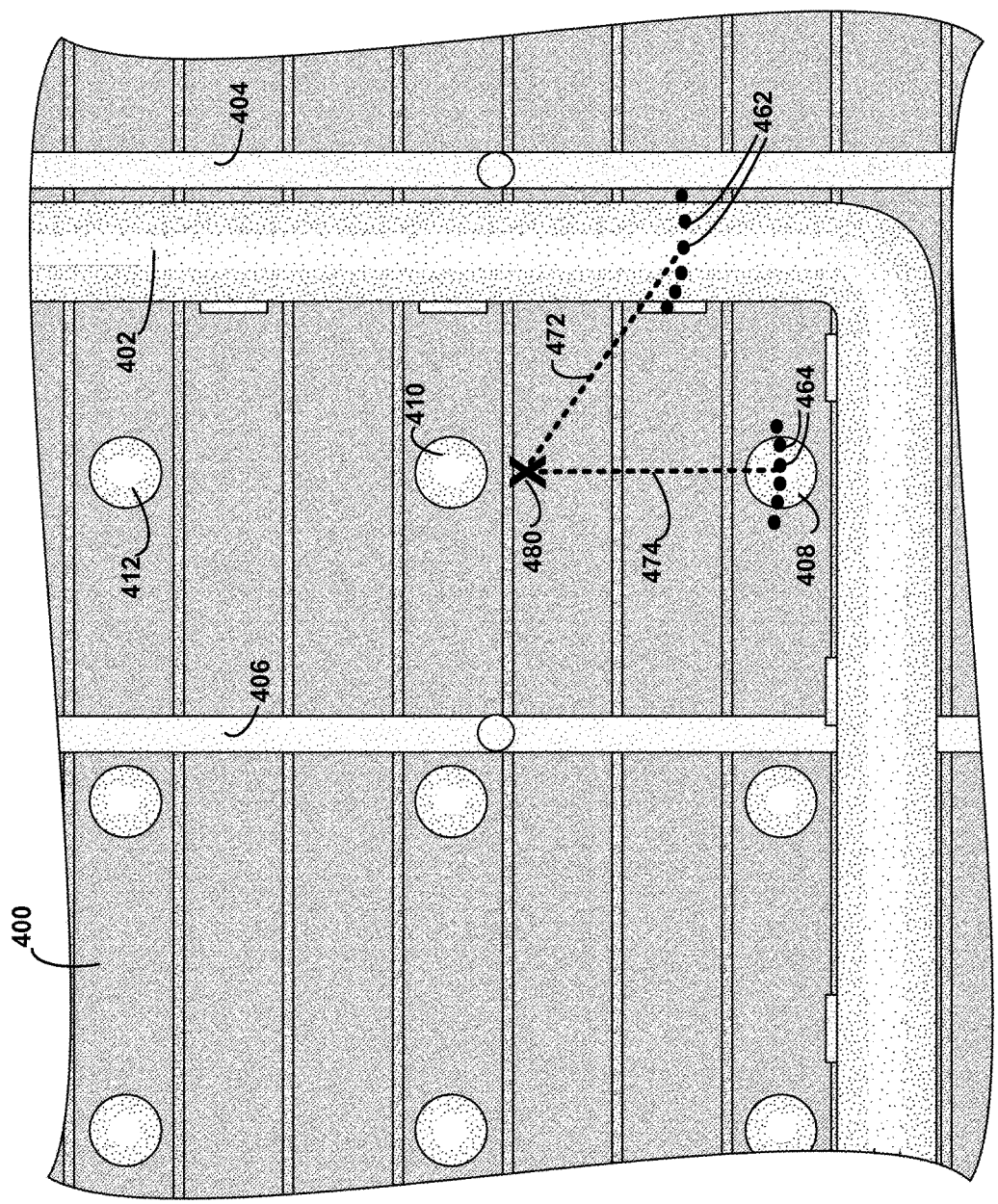
FIG. 4E illustrates a depth map of a building ceiling with a position of a robot, according to an example embodiment.

FIG. 4E illustrates a position of a robot on a depth map of a building surface, according to an example embodiment. More specifically, after detected points 462 and 464 are aligned with the depth map, distances from the robot to the detected points may be used to determine a location 480 of the robot in the building. For instance, distance 472 indicates a horizontal distance on the map between the robot and one of the detected points 462. The distance from the detected point to a sensor on the robot as well as the position and orientation of the sensor on the robot may be used to determine horizontal distance 472. Similarly, horizontal distance 474 indicates a horizontal distance on the map between the robot and one of the detected points 464. Additional distances between the robot and other detected points, including detected points 462 and 464 and/or detected points corresponding to different contours, may be used for more precise determination of robot location 480.

As shown in FIG. 4E, a robot's position relative to a map of a building ceiling may also show a robot's position in the building because the ceiling is aligned over a floor of the building on which the robot is operating. A ceiling may be useful for robot localization because some part of the ceiling is likely to be visible by a robot located at any point on the floor of the building. Additionally, a building ceiling is likely to be relatively stable over time, perhaps more so than other building surfaces. However, other building surfaces may be used for robot localization as well or instead. For another surface such as a side wall, a transformation may be used to determine a robot's position on the floor of the building once the robot's position relative to the surface has been determined.

In some examples, a robot may employ one or more other methods of localization in addition to those previously described. In such examples, surface contour localization within a building may be used by the robot to refine and/or verify its position indicated by other localization techniques. For instance, a mobile robot may use one or more distance sensors to keep track of its position on the floor of a building. As a specific example, a wheel speed sensor may be used to determine how fast the robot is travelling at any given point in time. The robot may then distance sensor data to continuously update its position on a map. However, this estimate of position may drift over time (e.g., due to imprecise data from distance sensors or unexpected events such as a position change resulting driving over a bump). Within examples, ceiling contour localization may be used periodically or continuously to correct for this drift.

Figure 4F:
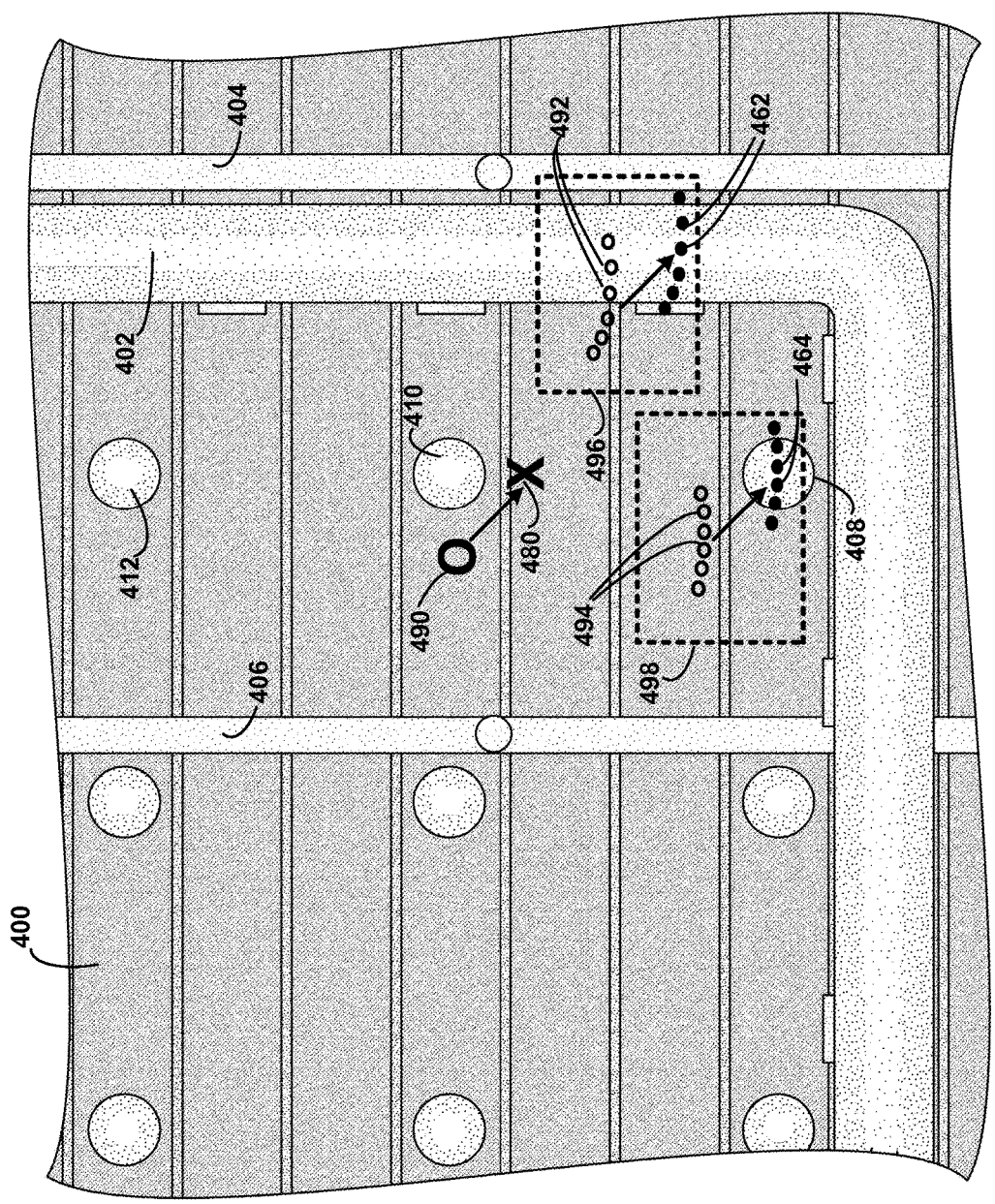
FIG. 4F illustrates a depth map of a building ceiling with an estimated position of a robot and a refined position of the robot, according to an example embodiment.

FIG. 4F illustrates a depth map of a building surface with an estimated position of a robot and a refined position of the robot, according to an example embodiment. More specifically, an estimated position 490 of a robot may be determined using any number of localization techniques. For instance, one or more distance sensors on the robot may be used to continuously keep track of the robot's position in the building as it navigates around. In some examples, this initial estimated position 490 may be used to simplify a ceiling contour alignment procedure to determine a more precise position of the robot within the building.

In particular, an initial estimated position of a robot may be used to determine one or more search areas on the depth map to look for matching surface contours. In reference to FIG. 4F, points 492 represent estimated positions of the detected points 462 on the depth map based on the initial estimated position 490 of the robot. Similarly, points 494 represent estimated positions of the detected points 464 on the depth map based on the initial estimated position 490 of the robot. The estimated positions of points 492 and 494 may be determined starting from the initial estimated position 490 of the robot and using the distances to detected points determined from sensor data. The estimated positions of points 492, 494 may be used as a starting point to search for positions that align detected points 462 and 464 with contours in the depth map.

In further examples, the initial estimated position 490 of the robot may be used to generate one or more search areas to search for matching contours for detected points. For instance, search area 496 is an area around the estimated locations of points 492 to search for matching contours in order to align the points 492 with the depth map. Similarly, search area 498 is an area around the estimated locations of points 494 to search for matching contours in order to align the points 494 with the depth map. In some examples, search areas may be incrementally increased in size until one or more matching contours are identified for a group of detected points.

The arrows in FIG. 4F represent a transformation or alignment from the initial estimated position 490 of the robot to the position 480 in the depth map. This refinement of the robot's position may be determined by locating matching contours for detected points 462 within search area 496 and by locating matching contours for detected points 464 within search area 498 on the depth map. Accordingly, the position 480 of the robot that aligns detected contours with their corresponding positions in the depth map may be determined without searching the entire depth map for matching contours. This procedure may also avoid aligning detected contours with false matches when the surface contains one or more repeating shapes or structures (e.g., if the initial search areas are small enough to only contain a single match).

In some examples, once a robot's position is determined within a building, it may be used to generate one or more navigation instructions for the robot. For instance, a robot may be instructed to move from the determined position to another position to pick up a box, transfer an object to another robot, or otherwise interact with the environment. More precise knowledge of the robot's current location may facilitate accurately executing these navigation tasks.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:

determining a depth map of at least one static surface of a building;

determining a plurality of surface contours in the depth map, wherein each of the plurality of surface contours comprises a group of connected points showing changing surface depth along the at least one static surface;

receiving sensor data from one or more sensors on a robotic device that is located in the building, wherein the received sensor data is indicative of the at least one static surface of the building;

determining, based on the received sensor data, a plurality of respective distances between the robotic device and a plurality of respective detected points on the at least one static surface of the building;

identifying at least one surface contour that includes the plurality of respective detected points on the at least one static surface of the building;

determining, for the at least one identified surface contour, at least one corresponding surface contour from the plurality of surface contours in the depth map such that the at least one identified surface contour and the at least one corresponding surface contour have matching changes in surface depth; and determining, based on the plurality of respective distances, a position of the robotic device in the building that aligns the at least one identified surface contour with the at least one corresponding surface contour in the depth map of the at least one static surface of the building.

2. The method of claim 1, wherein the at least one static surface of the building comprises a ceiling of the building that is located above a floor of the building on which the robotic device is configured to travel.

3. The method of claim 1, wherein the one or more sensors on the robotic device are oriented on the robotic device in one or more respective directions that provide one or more unobstructed views of the at least one static surface of the building while the robotic device is operating within the building.

4. The method of claim 1, wherein the one or more sensors on the robotic device are fixed in orientation in one or more respective directions to provide one or more respective views of the at least one static surface, and wherein the method further comprises:
   receiving the sensor data from the one or more sensors at a plurality of consecutive times while the robotic device is moving within the building, wherein the plurality of respective detected points correspond to the plurality of consecutive times; and
   determining the plurality of respective distances between the robotic device and the plurality of respective detected points at the corresponding plurality of consecutive times.

5. The method of claim 1, wherein determining the depth map of the at least one static surface of the building comprises:
   causing at least one mapping robot to navigate through the building;
   receiving sensor data from at least one depth camera on the at least one mapping robot that is indicative of depth of the at least one static surface of the building; and
   determining the depth map based on the received sensor data from the at least one depth camera.

6. The method of claim 1, wherein the one or more sensors on the robotic device comprise one or more laser rangefinders oriented in one or more respective directions to provide one or more respective views of the at least one static surface of the building.

7. The method of claim 1, further comprising:
   determining an estimated location of the robotic device in the building as the robotic device is moving within the building based on sensor data from at least one distance sensor on the robotic device;
   determining at least one search area on the depth map to search for the at least one surface contour that includes the plurality of respective detected points based on the estimated location of the robotic device in the building; and
   identifying the at least one surface contour by searching the at least one determined search area on the depth map.

8. The method of claim 7, wherein the at least one distance sensor on the robotic device comprises at least one wheel speed sensor that is configured to detect a speed of at least one wheel on the robotic device as the robotic device is moving within the building.

9. The method of claim 1, further comprising:
   determining an orientation of the robotic device relative to the at least one static surface of the building based on sensor data from at least one inertial measurement unit on the robotic device; and
   using the determined orientation to determine the plurality of respective distances between the robotic device and the plurality of respective detected points on the at least one static surface of the building.

10. The method of claim 1, further comprising:
    determining that a particular sensor of the one or more sensors on the robotic device is obstructed by one or more obstructions between the robotic device and the at least one static surface; and
    responsively causing a change in orientation of the particular sensor.

11. The method of claim 1, further comprising:
    providing navigation instructions for the robotic device to navigate within the building based at least in part on determined position of the robotic device in the building.

12. A robotic device, comprising:
    one or more sensors; and
    a control system configured to:
    determine a depth map of at least one static surface of a building in which the robotic device is located;
    determine a plurality of surface contours in the depth map, wherein each of the plurality of surface contours comprises a group of connected points showing changing surface depth along the at least one static surface;
    receive sensor data from the one or more sensors, wherein the received sensor data is indicative of the at least one static surface of the building;
    determine, based on the received sensor data, a plurality of respective distances between the robotic device and a plurality of respective detected points on the at least one static surface of the building;
    identify at least one surface contour that includes the plurality of respective detected points on the at least one static surface of the building;
    determine, for the at least one identified surface contour, at least one corresponding surface contour from the plurality of surface contours in the depth map such that the at least one identified surface contour and the at least one corresponding surface contour have matching changes in surface depth; and
    determine, based on the plurality of respective distances, a position of the robotic device in the building that aligns the at least one identified surface contour with the at least one corresponding surface contour in the depth map of the at least one static surface of the building.

13. The robotic device of claim 12, wherein the at least one static surface of the building comprises a ceiling of the building that is located above a floor of the building on which the robotic device is configured to travel.

14. The robotic device of claim 12, wherein the one or more sensors on the robotic device are oriented on the robotic device in one or more respective directions that provide one or more unobstructed views of the at least one static surface of the building while the robotic device is operating within the building.

15. The robotic device of claim 12, wherein the one or more sensors on the robotic device are fixed in orientation in one or more respective directions to provide one or more respective views of the at least one static surface, and wherein the control system is further configured to:
    cause the robotic device to travel within the building;
    receive the sensor data from the one or more sensors at a plurality of consecutive times while the robotic device is travelling within the building, wherein the plurality of respective detected points correspond to the plurality of consecutive times; and
    determine the plurality of respective distances between the robotic device and the plurality of respective detected points at the corresponding plurality of consecutive times.

16. The robotic device of claim 12, wherein the one or more sensors on the robotic device comprise one or more laser rangefinders oriented in one or more respective directions to provide one or more respective views of the at least one static surface of the building.

17. The robotic device of claim 12, further comprising at least one distance sensor, wherein the control system is further configured to:
- determine an estimated location of the robotic device in the building as the robotic device is moving within the building based on sensor data from the at least one distance sensor;
- determine at least one search area on the depth map to search for the at least one surface contour that includes the plurality of respective detected points based on the estimated location of the robotic device in the building; and
- identify the at least one surface contour by searching the at least one determined search area on the depth map.

18. The robotic device of claim 12, wherein the control system is further configured to determine the position of the robotic device in the building based on the plurality of respective distances by:
- determining an angle between the robotic device and a detected point of the plurality of respective detected points based on an orientation of a sensor on the robot that detected the detected point; and
- determining a lateral distance between the robotic device and the detected point in the building based on the angle and the distance between the robot and the detected point.

19. The robotic device of claim 12, further comprising at least one inertial measurement unit, wherein the control system is further configured to:
- determine an orientation of the robotic device relative to the at least one static surface of the building based on sensor data from the at least one inertial measurement unit on the robotic device; and
- use the determined orientation to determine the plurality of respective distances between the robotic device and the plurality of respective detected points on the at least one static surface of the building.

20. A non-transitory computer readable medium having stored therein instructions, that when executed by a control system of a robotic device, cause the control system to perform functions comprising:
- determining a depth map of at least one static surface of a building;
- determining a plurality of surface contours in the depth map, wherein each of the plurality of surface contours comprises a group of connected points showing changing surface depth along the at least one static surface;
- receiving sensor data from one or more sensors on a robotic device that is located in the building, wherein the received sensor data is indicative of the at least one static surface of the building;
- determining, based on the received sensor data, a plurality of respective distances between the robotic device and a plurality of respective detected points on the at least one static surface of the building;
- identifying at least one surface contour that includes the plurality of respective detected points on the at least one static surface of the building;
- determining, for the at least one identified surface contour, at least one corresponding surface contour from the plurality of surface contours in the depth map such that the at least one identified surface contour and the at least one corresponding surface contour have matching changes in surface depth; and
- determining, based on the plurality of respective distances, a position of the robotic device in the building that aligns the at least one identified surface contour with the at least one corresponding surface contour in the depth map of the at least one static surface of the building.

* * * * *